United States Patent [19]

Adams et al.

[11] 4,155,768

[45] May 22, 1979

[54] WATERFAST INK FOR USE IN INK JET PRINTING

[75] Inventors: Genevieve M. Adams; Richard D. Balanson, both of Morgan Hill; Clinton D. Snyder, Los Gatos, all of Calif.

[73] Assignee: International Business Machines Corporation, Armonk, N.Y.

[21] Appl. No.: 857,629

[22] Filed: Dec. 5, 1977

[51] Int. Cl.$^2$ ............................................. C09D 11/00
[52] U.S. Cl. ....................................... 106/23; 106/22; 106/308 N
[58] Field of Search .................................. 106/22-26, 106/308 N

[56] References Cited

U.S. PATENT DOCUMENTS 3,891,581   6/1975   Argenio ................................. 106/22

OTHER PUBLICATIONS

"Preparation & Dyeing of Synthetic Fibers", H. U. Schmidlin, (1963), Chapman & Hall, Ltd., London, pp. 200, 201.
"The Chemical Technology of Dyeing & Printing", Dr. Louis Diserens, vol. 11, (1951), Reinhold Publ. Corp., N.Y., pp. 46, 48, 65, 66, 68, 71, 101, 103, & 108.

Primary Examiner—J. Ziegler
Attorney, Agent, or Firm—Joseph G. Walsh

[57] ABSTRACT

An ink for use in ink jet printers is provided. The ink contains a water soluble dye, a polyamine containing 6 or fewer nitrogen atoms per molecule, with the ink composition having a pH of 8 or below. The ink has improved waterfastness over an equivalent ink formulation without the polyamine additive.

9 Claims, No Drawings

WATERFAST INK FOR USE IN INK JET PRINTING

BACKGROUND OF THE INVENTION

The present invention is concerned with an ink for use in ink jet printers. The inks used in ink jet printers at the present time have need for improvement in waterfastness, i.e. the printing on a document should be resistant to wet rubbing as, for example, from a moist hand, and should remain legible even after the document has accidentally been exposed to water as, for example, from a flood or spilled water. The present invention provides a solution to this problem.

PRIOR ART

Polyethyleneimine has, in the past, been proposed as an additive to improve waterfastness of inks to be used in ink jet printing. Polyethyleneimine, however, has been found not useful for inks designed for jet printer use which are not strongly alkaline. In the pH range below 8 most polyamines are substantially protonated; that is, approximately 50% protonation at ph7. Thus, in the pH range below 8, interaction with the negatively charged sulfonic acid groups attached to direct or acid dyes causes dye polyamine aggregation. Such aggregation can be manifested as ink precipitation, which is most undesirable for jet printer operation. Also, those direct and acid dyes which also contain an azo (—N=N—) linkage are decomposed in aqueous solution by primary amines. This reaction occurs at room temperature upon extended shelf storage or more rapidly upon accelerated aging, for example at 60° C. The mechanism of this reaction is thought to involve reductive cleavage of the dye azo linkages. In addition to loss of tinctorial value of the dye through such decomposition, amine fragments from the dye are liberated and dye precipitation may also occur. All of these consequences are undesirable for jet printer operation. The additives of the present invention, namely, polyamines, are to be distinguised from the polyethyleneimines of the prior art in that prior art material contains at least 7 nitrogen atoms per molecule, while the additive of the present invention contains 6 or fewer. In addition, it is preferred that none of these amine functionalities be primary in order to avoid the aforementioned azo dye decomposition reaction. In general, the latter requirement may be met by peralkylation reactions, although other methods may also be envisaged by those skilled in the art.

SUMMARY OF THE INVENTION

The present invention is concerned with an ink with improved waterfastness for use in ink jet printing. The ink is an aqueous solution having a pH of 8 or below and comprising at least one water soluble dye and from about ½ to about 5% by weight of a polyamine having 6 or fewer nitrogen atoms per molecule. It is preferred that none of the amine functionalities be primary. The preferred polyamine is permethylated tetraethylene pentamine.

Other ingredients may also be present, for example, organic components which are well known in the prior art and which function as humectants, dye solubilizers, penetrants, sequestrants and biocides may be used, when desired, to modify the above formulation for improved ink jet function.

DETAILED DESCRIPTION OF INVENTION

It has unexpectedly been found that the addition of various low molecular weight polyamines, that is, polyamines containing 6 or fewer nitrogen atoms per molecule, to various ink formulations containing a water soluble dye has resulted in a substantial improvement in waterfastness when these inks are printed on paper. Specific fomulae for these inks are enumerated below.

| Materials | Formulation (Parts by Weight) | | | | |
| --- | --- | --- | --- | --- | --- |
| | 1 | 2 | 3 | 4 | 5 |
| C.I. Acid Black 2 | 7.0 | 7.0 | 7.0 | 7.0 | 7.0 |
| C.I. Direct Orange 72 | 1.5 | 1.5 | 1.5 | 1.5 | 1.5 |
| Butyl carbitol | 0.0 | 7.0 | 0.0 | 7.0 | 7.0 |
| Tetraethylenepentamine | 0.0 | 0.0 | 2.0 | 2.0 | 0.0 |
| Permethylated tetraethylenepentamine | 0.0 | 0.0 | 0.0 | 0.0 | 2.0 |
| Distilled Water | 91.5 | 84.5 | 89.5 | 82.5 | 82.5 |
| Adjusted to pH 7.0 with hydrochloric acid. | | | | | |

The expressions "C.I. Direct" and "C.I. Acid" refer to the standard text called the Colour Index, in which Direct and Acid Dyes are defined and exemplified. C.I. Direct and C.I. Acid Dyes are the preferred types of water soluble dyes for use in the present invention. In general, the concentration of the dye should be between about ½% by weight and about 10% by weight.

Specific examples of polyamines useful in the present invention include tetraethylene pentamine, triethylene tetraamine, diethylenetriamine, spermidine, spermine, N,N'Bis-(-3-aminopropyl)-piperazine, methenamine, and the corresponding permethylated compounds.

The waterfastness effect can be measured by determining the reflectance optical density of a printed sample before and after soaking in distilled water for 18 hours. The waterfastness ratio at the particularly wavelength chosen, usually corresponding to the absorption maximum of the dye of interest, is defined as ratio of the optical density after soaking divided by that obtained before soaking. The stability of the ink formulations can be assessed by determining the number of particles greater than 3 microns by Coulter count after aging sealed ink samples for 14 days at 61° C. These comparisons for formulations 1–5 are enumerated below.

| Formulation | Waterfastness Ratio at 600 nm | Particles Greater than 3μm |
| --- | --- | --- |
| 1 | 0.24 | 1,100 |
| 2 | 0.36 | 750 |
| 3 | 0.42 | 160,000 |
| 4 | 0.83 | 70,000 |
| 5 | 0.79 | 300 |

These comparisons show the beneficial effect of the polyamine additives in terms of waterfastness and the necessity for peralkylation, in this case permethylation, to achieve ink stability when azo dyes, e.g. CI Direct Orange 72, are present. Also shown is the beneficial enhancement, particularly in terms of waterfastness effect, afforded by the addition of a penetrant, in this case butyl carbitol, to the ink formulation. In order to achieve appreciable benefit, the concentration of the additive should be at least about ½% by weight. On the other hand, when the concentration of the additive is above about 5%, there is a tendency for the dye to precipitate. In general, it is preferred that the additive be present at about 2%. The preferred permethylated tetraethylene pentamine can be synthesized by an appropriately modified Leuchart reaction as described below.

Tetraethylenepentamine (95g, 0.50 moles) was added dropwise with stirring and cooling to 88% formic acid (400 ml, 9.6 moles) contained in a roundbottom flask. Then 37% formalin (325 ml, 4.25 moles) was added and the mixture refluxed for 6 hours. Next, solvents were removed in vacuo to obtain a clear, amber, viscous oil. This was neutralized with 50% sodium hydroxide solution (200 ml, 3.85 moles) using mechanical stirring and cooling. The resulting aqueous slurry was extracted with ethyl ether (400 ml) and the ether extract dried over sodium hydroxide pellets, filtered and evaporated to yield the desired product (85 g, 59%). The product could be further purified by vacuum distillation (bp range 85°–128° at 10 μm Hg) to yield the purified amine (74g, 51%).

Direct and acid dyes are well known to the prior art. They may be used with the present invention to obtain whatever color ink is desired. Particularly suitable dyes include C.I. Acid Black 2 and C.I. Direct Orange 72.

As is well known in the art, the use of a penetrant increases the waterfastness effect for most inks. Particularly suitable are butyl carbitol and butyl cellusolve.

The foregoing examples are given solely for purposes of illustration and are not to be considered limitations on the invention, many variations of which are possible without departing from the spirit or scope thereof.

What is claimed is:

1. An ink composition comprising an aqueous solution of at least one water soluble dye in about ½% to about 10% by weight concentration and a polyamine having 6 or fewer nitrogen atoms per molecule in about ½% to about 5% by weight concentration, with the composition having a pH of 8 or below.

2. A composition as claimed in claim 1 where the water soluble dye is chosen from the group consisting of Colour Index Direct Dyes and Colour Index Acid Dyes.

3. A composition as claimed in claim 1 where the polyamine contains no primary nitrogens.

4. A composition as claimed in claim 1 having a pH of 7.

5. A composition as claimed in claim 1 in which the polyamine is permethylated.

6. A composition as claimed in claim 1 comprising a penetrant.

7. A composition as claimed in claim 1 comprising a sequestrant.

8. A composition as claimed in claim 1 wherein the polyamine is present at about 2% by weight concentration.

9. A composition as claimed in claim 1 wherein the polyamine is permethylated tetraethylenepentamine.

* * * * *